(12) United States Patent
Schreder et al.

(10) Patent No.: US 7,262,144 B2
(45) Date of Patent: Aug. 28, 2007

(54) PHOTOSTRUCTURABLE BODY AND PROCESS FOR TREATING A GLASS AND/OR A GLASS-CERAMIC

(75) Inventors: Bianca Schreder, Frankfurt am Main (DE); Josè Zimmer, Ingelheim (DE); Matthias Brinkmann, Nieder-Olm (DE); Michael Kluge, Offenbach (DE)

(73) Assignee: Schott AG, Mainz (DE)

( * ) Notice: Subject to any disclaimer, the term of this patent is extended or adjusted under 35 U.S.C. 154(b) by 8 days.

(21) Appl. No.: 10/770,644

(22) Filed: Feb. 3, 2004

(65) Prior Publication Data

US 2004/0180773 A1    Sep. 16, 2004

(30) Foreign Application Priority Data

Feb. 3, 2003   (DE) ................. 103 04 382

(51) Int. Cl.
*C03C 3/083* (2006.01)
*C03C 3/091* (2006.01)
*C03C 10/12* (2006.01)

(52) U.S. Cl. .................. 501/66; 501/68; 501/56; 501/57; 501/58; 501/59; 501/73; 501/77; 501/78; 501/7; 385/129; 385/141; 359/343

(58) Field of Classification Search .......... 501/4, 501/7, 56, 57, 64, 13, 37, 66, 68, 58, 59, 501/73, 77, 78; 385/129, 141; 359/343
See application file for complete search history.

(56) References Cited

U.S. PATENT DOCUMENTS

| | | | | |
|---|---|---|---|---|
| 4,017,318 A * | 4/1977 | Pierson et al. ................. 501/13 |
| 4,480,044 A | 10/1984 | McAlinn |
| 5,078,771 A * | 1/1992 | Wu ........................... 65/30.11 |
| 5,102,833 A * | 4/1992 | Sehgal et al. ................. 501/4 |
| 5,206,496 A | 4/1993 | Clement et al. ............ 250/271 |
| 5,212,120 A * | 5/1993 | Araujo et al. ................. 501/13 |
| 5,932,498 A * | 8/1999 | Beeteson et al. ............. 501/13 |
| 5,978,538 A | 11/1999 | Miura ........................ 385/123 |
| 6,086,977 A * | 7/2000 | Suzuki et al. ............... 428/141 |
| 6,132,643 A * | 10/2000 | Pavel .................. 252/301.4 R |
| 6,154,593 A | 11/2000 | Miura ........................ 385/123 |
| 6,228,787 B1 * | 5/2001 | Pavel ........................... 501/13 |
| 6,300,262 B1 * | 10/2001 | Beall ............................. 501/5 |
| 6,566,626 B2 * | 5/2003 | Gaissinsky et al. .... 219/121.69 |
| 6,632,759 B2 * | 10/2003 | Borelli et al. ................. 501/66 |

(Continued)

FOREIGN PATENT DOCUMENTS

DE         19841547         3/2000

(Continued)

OTHER PUBLICATIONS

Hirao et al. "Writing waveguides and gratings in silica and related materials by a femtosecond laser." J. Non-Crystalline Solids 239 (1998) 91-95.

*Primary Examiner*—Karl Group
(74) *Attorney, Agent, or Firm*—Ohlandt, Greeley, Ruggiero & Perle L.L.P.

(57) ABSTRACT

The invention relates to a photostructurable body, in particular glass or glass-ceramic, in which the glass is a multicomponent glass and/or the glass-ceramic is a multicomponent glass-ceramic, in each case having a positive change in refractive index Δn as a result of the action of light.

14 Claims, 4 Drawing Sheets

Exemplary Embodiment 1

U.S. PATENT DOCUMENTS

| | | | |
|---|---|---|---|
| 6,640,039 B1* | 10/2003 | Miura et al. | 385/129 |
| 6,667,257 B2* | 12/2003 | Cole et al. | 501/37 |
| 6,849,334 B2* | 2/2005 | Horne et al. | 428/402 |
| 6,977,137 B2* | 12/2005 | Borrelli et al. | 430/321 |
| 2002/0033031 A1 | 3/2002 | Borrelli et al. | |
| 2003/0087742 A1* | 5/2003 | Taylor et al. | 501/4 |
| 2004/0198582 A1* | 10/2004 | Borrelli et al. | 501/56 |
| 2004/0259030 A1* | 12/2004 | Hayden et al. | 430/270.12 |

FOREIGN PATENT DOCUMENTS

| | | | |
|---|---|---|---|
| DE | 10155492 | * | 10/2003 |
| EP | 0797112 | A1 | 9/1997 |
| EP | 1045262 | A1 | 10/2000 |
| GB | 998319 | | 4/1965 |
| GB | 2 379 441 | | 3/2003 |
| JP | 09311237 | | 2/1997 |
| WO | WO 01/09899 | | 2/2001 |
| WO | WO 01/44871 A1 | | 6/2001 |

* cited by examiner

Figure 1: Exemplary Embodiment 1
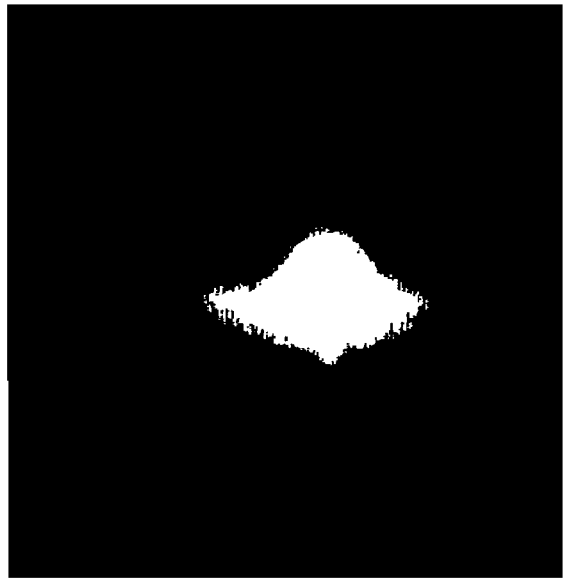
Figure 2: Exemplary Embodiment 2
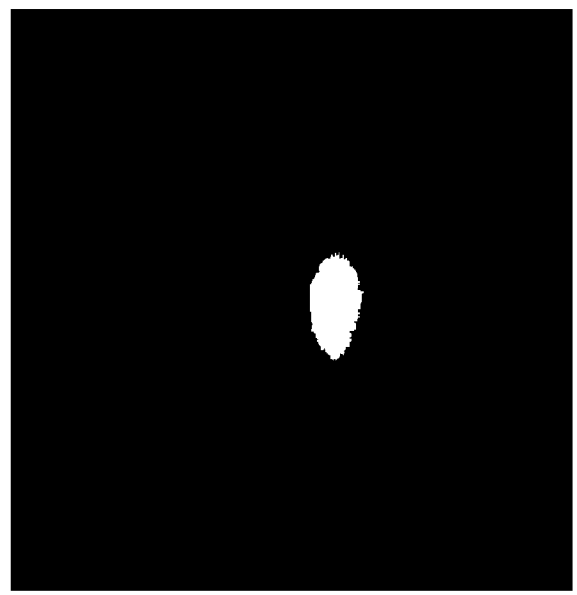

Figure 3: Example for a negative change in the refractive index
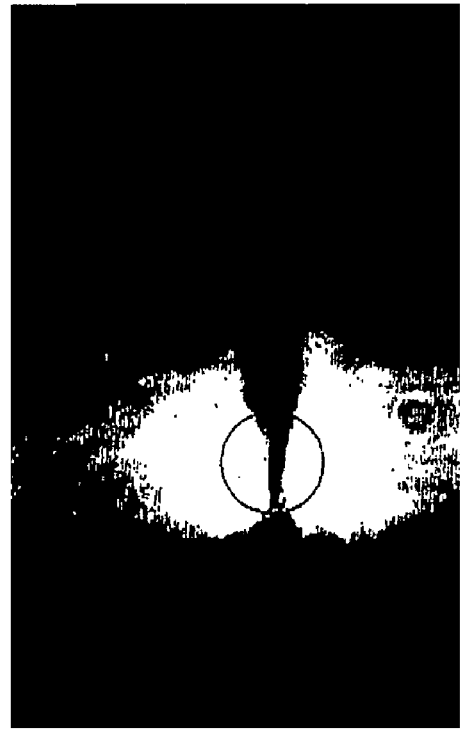
Figure 4: Typical positive change in the refractive index in fused silica

Figure 5: Exemplary Embodiment 7:
Figure 6: Model image representing the index distribution in glasses with a negative Δn
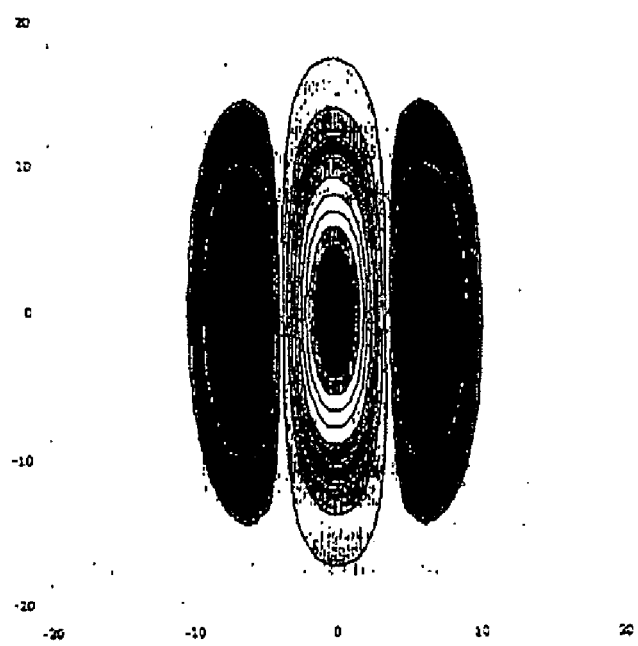

Figure 7: Calculation of the index profile via densification theory: excerpt 0 to +10$^{-3}$
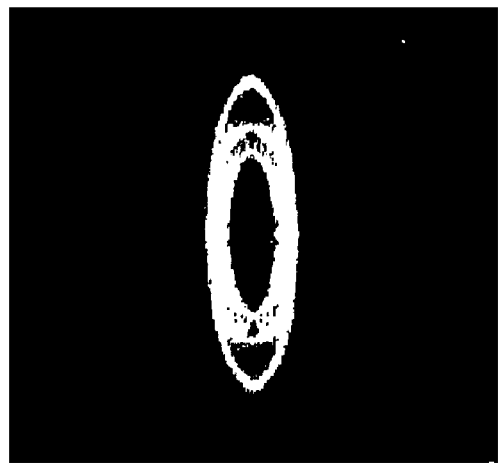
Figure 8: Calculation of the index profile via densification theory: excerpt left-hand scale -10$^{-3}$ to 0; excerpt r 0 to +10$^{-3}$
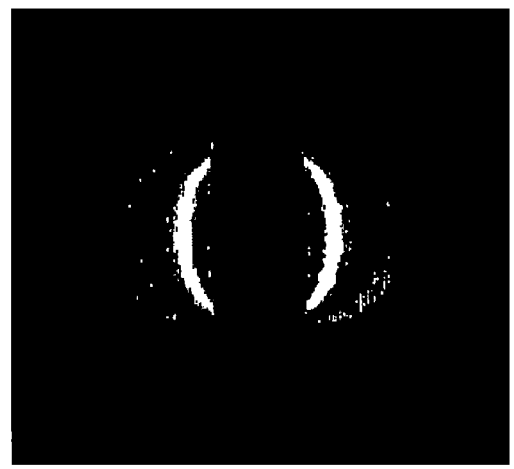

PHOTOSTRUCTURABLE BODY AND PROCESS FOR TREATING A GLASS AND/OR A GLASS-CERAMIC

BACKGROUND OF THE INVENTION

1. Field of the Invention

The invention relates to a photostructurable body having glass or glass-ceramic and processes for treating.

2. Description of Related Art

Optical components, which are based on the guidance and manipulation of light through structures, such as waveguides and gratings, are already known, for example in the sensor technology and telecommunications sectors. The primary medium for wave guidance is currently optical fibers; however, planar components are becoming more important on account of increased demands for miniaturization and increased complexity. The advantage of planar components is the possibility of producing a multifunctional component on just a single chip and thereby, for example, minimizing the coupling losses and also the production-related outlay for different components and therefore the costs of these components.

Although bifunctional or multifunctional components can also to a certain extent be produced in fibers, for example suitably doped fused silica ($SiO_2$), in particular Ge-doped $SiO_2$, is already being used for the production of Bragg gratings as (de)multiplexers, for example in wavelength filtering or for sensors in fibers. In this case, UV irradiation is used to produce an inhomogeneous defect distribution in the Ge-doped glass, and this, by changing the absorption coefficient, leads to changes in the refractive index. These gratings or other structures can also be produced in a similar way in certain Pb—, RE—(RE=Rare Earth) and Ag-doped glasses. Furthermore, suitable conditioning processes can be used for the targeted precipitation and subsequent selective etching of the microcrystals within the irradiated regions, as for example in the case of Corning 8603 Fotoform/FotoCeram or Hoya PEG-3.

It is also known that by irradiating different glasses with suitable high-energy pulses (fs pulses), it is possible to produce structures in glass. For example, positive changes in the refractive index in the range up to $10^{-2}$ have been produced by the fs writing of Ge-doped $SiO_2$ glass or fused silica (K. Hirao et al., J. Non-Cryst. Solids 235, pp. 31-35, 1998).

Negative changes in refractive index have also been observed in borosilicates, sulfide glasses and lead glasses, cf. in this respect Corning WO 01/44871, PCT/US00/20651. By suitably setting the pulse energy and the writing speed, it is in this case possible to produce changes in refractive index without physically damaging the glass.

SUMMARY OF THE INVENTION

DE 19841 547 A1 describes a method for producing colored structures in glass by local heating of volume elements within the glass using laser light. The glass contains sub-microscopically sized particles. Coloration is effected by reducing agents present in the glass that reduce metal ions to metal atoms, which aggregate subsequently to form metal particles.

The invention is based on the object of overcoming conventional limitations on structuring using light and of providing materials and processes which in particular allow the direct writing of waveguide structures.

This object is achieved, in a surprisingly simple way, by means of the features described in the present disclosure.

The invention for the first time, in a particularly advantageous and surprising way, describes a material which is not fused silica, but rather provides a wide class of glasses having the positive change in refractive index $\Delta n$ which is advantageously desired.

A particularly preferred embodiment comprises an LAS glass (lithium-aluminosilicate glass).

A further particularly preferred embodiment results if the glass is an LAS glass-ceramic (lithium-aluminosilicate glass-ceramic).

A preferred LAS glass and/or LAS glass-ceramic has a composition of from 15 to 90% by weight of $SiO_2$, from 1 to 35% by weight of $Al_2O_3$, from 1 to 20% by weight of $Li_2O$.

A particularly preferred LAS glass and/or LAS glass-ceramic has a composition of from 20 to 85% by weight of $SiO_2$, from 5 to 35% by weight of $Al_2O_3$, from 1 to 18% by weight of $Li_2O$.

The most preferred composition comprises from 25 to 75% by weight of $SiO_2$, from 5 to 30% by weight of $Al_2O_3$, from 2 to 15% by weight of $Li_2O$.

To increase the sensitivity or photosensitivity, it is advantageous for the glass and/or glass-ceramic to comprise a sensitizer and/or activator which is preferably selected from the group consisting of Ce, Er, Eu, ions and mixtures thereof. As an alternative or in addition, the glass and/or glass-ceramic may comprise a photosensitive element or a mixture of photosensitive elements which are preferably selected from the group consisting of Cu, Ag, Au, $Ce^{3+}$, $Eu^{2+}$ and the further ions and mixtures thereof, in order in this way to provide absorption centers which are preferably suitable.

The sensitivity can advantageously be increased further if the glass and/or glass-ceramic in addition or as an alternative comprises halides which are preferably selected from the group consisting of F, Br, Cl, I and ions and mixtures thereof.

In a further embodiment, the glass and/or glass-ceramic comprises lithium silicate crystal phases and/or beta-quartz solid solution fractions or structures.

In a further embodiment, the glass and/or glass-ceramic advantageously comprises lithium disilicate and/or lithium metasilicate and/or keatite.

For the change in the refractive index brought about during the structuring, it is useful if the glass and/or glass-ceramic comprises Ag halide crystallites and/or clusters, since this too makes it possible to provide interaction areas for the light which is introduced.

In a further embodiment the glass and/or glass-ceramic comprises silver or gold clusters.

As an alternative or in addition, the glass and/or glass-ceramic, after the structuring, comprises two-dimensional and/or three-dimensional structures which are preferably produced by at least partially destroying the crystallites by means of fs irradiation.

In a particularly preferred embodiment, the glass and/or glass-ceramic comprises a dopant which has an energy position, preferably demonstrated by its absorption, which is located within a band gap of the glass.

If the dopant provides absorption centers for the absorption of light which can be bleached out and can be used to influence the refractive index of the glass, it is possible to effect a change in the refractive index even using light of a wavelength lying in the visible region of the spectrum, with the result that the intensity required for the structuring can be reduced.

To treat a glass and/or a glass-ceramic as described in claim [lacuna], it is possible for the structuring using light to comprise a photostructuring step using fs light pulses, in particular fs laser light pulses, which make it possible to achieve a particularly high degree of homogeneity of the resultant structure.

To produce two-dimensional and/or three-dimensional structures by means of photostructuring, a subsequent thermal and/or chemical treatment, in particular an etching treatment, may be very useful, since structured regions often have a different chemical reactivity or an altered etching rate.

It is also advantageous to produce silver or gold clusters using the process according to the invention; in this case, the glass and/or glass-ceramic comprises silver or gold fractions.

BRIEF DESCRIPTION OF THE DRAWINGS

The invention is described in more detail below on the basis of preferred embodiments and with reference to the appended figures, in which:

FIG. 1 shows a first exemplary embodiment 1, in which, unlike the waveguides made from $SiO_2$ and other known glasses which have already been written using fs laser light pulses, the waveguides in an LAS glass have an ideal round shape, FIG. 2 shows a second exemplary embodiment 2, in which, unlike the waveguides made from $SiO_2$ and other known glasses which have already been written using fs laser light pulses, the waveguides in some of the LAS glasses have an ideal round shape; in the case of glass 2, the scattered light fraction is particularly low, FIG. 3 shows an example of the negative change in refractive index exhibited by glasses with a negative $\Delta n$, wherein dark "anti-waveguides" having two bright flanks to the left and right of the actual structure are revealed on examination under a microscope; these flanks may form as a result of strain-induced changes in refractive index, FIG. 4 shows typical positive changes in refractive index in fused silica, FIG. 5 shows the third exemplary embodiment, glass 7 from Table 1, FIG. 6 shows a model image illustrating the refractive index distribution in glasses with a negative $\Delta n$ and for comparison with experimentally acquired results which are presented in FIGS. 1 to 5 and the tables which follow, FIG. 7 shows a graphical representation of the calculation of the refractive index profile by means of the densification theory for an excerpt from the positive change in refractive index from 0 to $+10^{-3}$, in particular for comparison with experimentally acquired results presented in FIGS. 1 to 5 and in the tables which follow, FIG. 8 shows a graphical representation of the calculation of the refractive index profile by means of the densification theory for an excerpt from the negative changes in refractive index on a scale from $-10^{-3}$ to 0, in particular for comparison with experimentally acquired results presented in FIGS. 1 to 5 and in the tables which follow.

The present invention comprises the use of LAS glasses and glass-ceramics for the production of microstructured components, in which structuring is carried out with the aid of light, preferably with the aid of laser light.

Furthermore, the invention comprises the structuring of LAS glass which contains suitable sensitizers, such as for example Ce, Eu, Er, ions and mixtures thereof.

Rare earth-doped glasses which contain $Eu^{2+}$ and/or $Ce^{3+}$ can be structured either by radiating in UV light, in which case photoreduction counts as one possible mechanism (this mechanism is described again separately in the next paragraph), or by means of fs radiation, for example in $Er^{3+}$—, $Tm^{3+}$—, . . . doped glasses: in this case, it is possible to produce active waveguides for use as amplifiers or lasers.

The invention also relates to LAS glass, which contains photoreducible ions, such as Ag, Au, Cu, or photooxidizable ions, such as $Eu^{2+}$ or $Ce^{3+}$, etc.

Furthermore, the invention also comprises LAS glass which contains polyvalent heavy metal and metal cations, such as for example Pb, Sb, Sn, Bi, Fe, etc. Cations such as Pb and Sn in this case act as photosensitive activators or sensitizers.

With the aid of UV radiation, it is in this case possible to produce gratings or structures with a high change in refractive index attributable to the formation of surface reliefs. Highly refractive structured glasses can be used for applications in the field of digital optical elements, DOEs.

The invention also comprises the writing of the above-mentioned glasses using intensive light.

Furthermore, the invention comprises the writing of these glasses using UV radiation.

Moreover, the invention relates to the writing of these glasses using ultra-short (fs) pulses.

A person skilled in the art will be able to adapt the writing parameters, such as laser wavelength, pulse duration and pulse power, in such a way that the change in refractive index can be set appropriately. In this context, it is appropriate to make use of the existing absorption bands in the glass and thereby to accurately set the transfer of energy required to change the refractive index. One simple approach which is possible is for the laser wavelength divided by an integer m where $m \geq 1$ to lie in a wavelength region which has a sufficient absorption which is significantly different than 0. In this context, local absorption maximums or absorption bands are particularly suitable.

By suitably utilizing two-photon or three-photon resonances, as described in the U.S. application Ser. No. 10/357,829 entitled "Resonantly Enhanced Photosensitiviy" in the name of the applicant Schott Corporation, Yonkers, N.Y., which is hereby incorporated in its entirety by reference in the subject matter of the present application, it is possible to achieve higher penetration depths or structure depths, which represents an important parameter with regard to the component efficiency in particular, for example, in the case of DOEs.

Furthermore, a person skilled in the art, by suitably doping the glass, can set the nature and level of the change in refractive index in a suitable way. In a first approach, the doping can be calculated from the level of absorption values desired, it being possible for this level to be suitably determined by means of simple tests, and the absorption can be correspondingly increased by increasing the doping.

A suitable thermal after treatment can lead to phase changes or precipitation of microcrystallites in the glass, and these can be used for the dimensionally accurate etching of microcomponents.

A suitable thermal after treatment can lead to the precipitation of microcrystallites in the glass, resulting in characteristically colored structures in the glass.

A suitable thermal after treatment can lead to the precipitation of nanocrystallites, such as Li disilicate or metasilicate in the glass, which also ensure a sufficient transparency of the material.

A heat treatment process for this purpose comprises a conditioning process which is first of all carried out at a relatively low temperature, meaning that the body is heated from room temperature at a rate of approx. 5° C. per min and is then held at approximately 500° C. for approx. 60 min, in order to produce crystals or to develop crystal nuclei.

Then, higher temperatures of 605° C. are used after a temperature rise at approx. 3° C. per min has been carried out.

This is followed by cooling to room temperature at approx. 5° C. per min in order for the structures to be etched out.

According to the invention, it is also possible to perform just a single conditioning step, after which nanocrystals which continue to leave the glass transparent are already present. During the second step described, which is also known as the growth step, the size of the nanocrystals is significantly increased, so that they form clusters.

After the first conditioning step alone, nanocrystals have diameters of approx. 30 to 40 nm and do not scatter the light. After the second growth step, the crystals become larger, cause the light to be scattered and may even make the glass opaque, depending on the duration of the heat treatment.

Depending on the particular application, it is possible to omit the first step, in order then to obtain fewer nuclei but larger crystals.

It is also possible to omit the second step, in order then to obtain fewer but more homogeneously distributed crystals.

DETAILED DESCRIPTION OF THE INVENTION

In the following detailed description, all the percentages are percentages by weight, unless otherwise indicated.

Furthermore, in the context of the invention, the term multicomponent glass is to be understood as meaning any glass which does not consist just of $SiO_2$ (fused silica), but rather includes more than one glass component.

In the context of the invention, a positive change in refractive index $\Delta n$ is to be understood as meaning an increase or rise in the refractive index value, in particular in the magnitude or measurable value of the refractive index.

In a particularly preferred form of the invention, LAS glasses (lithium aluminosilicate glass) are used to write in structures, such as for example waveguides and gratings, by means of (laser) light. The glass can be used for the production of optical and other components which are based on 2D and 3D microstructuring.

This allows structuring by changing the refractive index immediately after the irradiation by changing the density d or the volume per unit weight and the absorption coefficient $\alpha(\lambda)$, and by thermal and/or chemical treatment, such as for example etching, following the exposure.

Bodies which have been structured in this manner can be used as part of a waveguide, waveguide laser and/or optical amplifier, as part of sensors (applications inter alia in Bragg gratings: multiplexers, demultiplexers or as a filter or optical data store, and also DOEs. Hidden or desired visible marking by means of structuring steps of this nature is also possible.

The glass used substantially comprises $SiO_2$, $Al_2O_3$ and $Li_2O$. The glass preferably contains from 15 to 90% of $SiO_2$, on a weight basis, as a network-forming agent.

The aluminum oxide content is between 1 and 35% of $Al_2O_3$. This can be used, inter alia, to set the chemical resistance of the glass. With higher $Al_2O_3$ contents, the glass tends to crystallize, which is not ruled out according to the invention but is merely less preferred. The $Li_2O$ content is between 1 and 20%.

If the material is used in crystallized form or is crystallized or partially crystallized after laser writing, Li is an important component of the main crystalline phases, such as for example beta-quartz solid solution, keatite, virgilite, petalite, eucryptite, spodumene or mixtures thereof. Furthermore, however, it is also possible for secondary phases, such as for example quartz, cristobalite or berlinite to occur.

Even if not all the phases are optically transparent or completely transparent, there are applications in the non-optical sector, for example MEMs or micromechanical applications, which do not necessarily require transparent material.

It is particularly preferable for a glass according to the invention to contain from 20 to 85% of $SiO_2$, from 3 to 27% or 5 to 35% of $Al_2O_3$ and from 2 to 20% or 1 to 18% of $Li_2O$. It is very particularly preferable for the glass according to the invention to contain from 25 to 85% or 25 to 75% of $SiO_2$, from 5 to 25% or 5 to 30% of $Al_2O_3$ and from 5 to 20% or 2 to 15% of $Li_2O$.

Furthermore, the glass may contain from 0 to 50% of $P_2O_5$, from 0 to 40% of $B_2O_3$, from 0 to 20% of alkali metal apart from Li, $R_2O$, R=Na, K, and alkaline-earth metal where R=Mg, Ba, Sr.

Further components which may be present include sensitizers, such as $Ce_2O_3$, $Er_2O_3$, $Eu_2O_3$, etc., photooxidizable and photoreducible elements, such as $Ag^+$, $Cu^{+/2+}$, $Au^+$, $Eu^{2+}$, $Ce^{3+}$, and other suitable elements.

The glass may also contain thermal stabilizers and refining agents, such as $Sb_2O_3$, $As_2O_3$, etc.

Furthermore, the glass may also contain halides, such as fluorine, chlorine and/or bromine.

Different crystalline phases, such as for example Li disilicate and metasilicate, keatite, virgilite, beta-quartz solid solution, keatite solid solution, petalite, cristobalite, etc., can be produced by suitable heat treatment.

Since, for example, virgilite or beta-quartz solid solution have a negative coefficient of thermal expansion, it is possible, by suitably selecting the glass composition and suitably adjusting the crystalline phase, to set the thermal expansion in a very wide range of expansions from less than 0 to greater than 10 ppm. In particular, it is possible to produce what are known as "zero-expansion materials" or "a thermal" materials.

Doping

The glass according to the invention can be structured in a wide range of ways by suitably selecting the doping and irradiation source. Therefore, depending on the particular doping and type of irradiation, a person skilled in the art could bring about increases in the refractive index or reductions in the refractive index in order to produce waveguides or gratings or other microstructures. Furthermore, by subsequent heat treatment, the irradiated area can be deliberately colored or ceramicized, for example by doping with Ag and halogen atoms or halides. The light-induced production of chemically unstable crystallites (e.g. lithium disilicate or metasilicate) in the glass makes it possible to produce structures in three dimensions.

fs Irradiation

WO 01/09899 A1 has disclosed the direct writing of wave-guiding structures into a glass substrate. For this purpose, a femtosecond laser pulse (e.g. Ti:sapphire laser system, wavelength 800 nm, 80 fs pulse duration, 1 kHz repetition rate, laser power adjustable up to 500 mW) is focused into a silicate glass in order for it to be heated to more than 1380 Kelvin at certain points. Furthermore, DE 101 55 492 A1 in the name of the same applicant gives an extensive description of the writing of changes in refractive index.

Writing Process

In detail, the laser beam is passed through suitable beam-shaping and guidance optics, comprising mirrors, filters and a microscope objective, before ultimately being focused into the glass. The incoming beam is split by a beam splitter with preferably 60% reflection and 40% transmission.

The power is in this case continuously monitored by a power meter. To prevent the optics from being destroyed by the high laser power, it is possible for the beam to be reduced by suitable gray filters (e.g. NG10 or a combination of NG5+NG9). The beam is then focused into the specimens by means of the microscope objective. The desired structures can then be produced in the glass by translational movement of the specimen relative to the beam.

JP 09311237, EP 797 112, EP 1 045 262, U.S. Pat. Nos. 6,154,593 and 5,978,538 describe, for example, the formation of optical waveguides in glass substrates.

However, investigations carried out by the inventors have shown that for different glasses, in particular LAS glasses, there are different sets of writing parameters, meaning different combinations of writing speed, pulse length, wavelength and power, which lead to optimum results.

These values are easy for a person skilled in the art to find by first of all, at an available wavelength and pulse length, increasing the power until initial changes in refractive index occur. Then, he can vary the pulse length and the power in such a way that the changes in refractive index of the desired level are achieved.

To write waveguides, the person skilled in the art can adapt the writing speed with a fixed laser pulse power in such a way that the punctiform structures fuse together to form waveguides which are as ideal as possible. If the writing speed is to be increased, the laser pulse power has to be correspondingly increased as well. If the writing speed is to be reduced, the laser pulse power has to be correspondingly reduced as well. However, modifications of this nature lie within the scope of the average person skilled in this field.

Typical ranges for the writing speed are in this case, for example, 125 to 250 μm/s. Higher writing speeds could also be achieved by increasing the laser repetition rate from kHz to MHz.

As a result of the waveguides being written, it is usually possible to observe stresses occurring at the sides of the waveguides.

These stresses lead to reductions in the refractive index if the structure is a waveguide or to increases in the refractive index if it is an anti-waveguide which has a negative Δn.

Structures of this type can be recognized even under a light microscope, therefore in the case of waveguides bright dashes or ideally dots which are flanked by dark areas and in the case of anti-waveguides as dark dots or dashes flanked by two bright areas, as illustrated in FIGS. 1 and 3.

The inventors' current explanation for the advantageous effects of the invention involve a physical and thermal approach for describing the glass transition, although this does not necessarily have to be physically correct, but rather is merely intended to serve as a possible explanation model to provide a better understanding of the surprising experimental results which have been discovered.

An FEM analysis using the ABAQUS FEM program was used in order to provide initial answers to this question.

In the inventors' current model, it is assumed that the glass transition at high heating and cooling rates can be described by a Tool-Narayanaswamy model. Model data are extrapolated to high temperatures and high heating rates.

The heating step will describe a thermal source intensity distribution which is dependent on the position. The shape of this heated volume resembles an ellipsoid. On account of the symmetry, an axially symmetrical or cylinder-symmetrical geometry was used in order to represent the geometric conditions in the glass in model form.

After the first step, which comprised 100 femtoseconds, of calculation of the temperature maximum, the result was an imaginary calculated temperature of approx. 2500 Kelvin in the center of the ellipsoid.

On account of the very high heating rates, this imaginary temperature does not have to coincide with the actual, real temperature, but at the end of the step the imaginary temperature in the region of the center of the ellipsoid is substantially equal to the real temperature.

In the second step, the heated ellipsoid is cooled by the environment by means of heat conduction.

After ten microseconds, imaginary temperature and viscoelastic stresses are produced. This results in the following effects or influences on the refractive index.

There are two effects on the local refractive index:

1. Compression on account of the differing local temperature or its temporal profile, which leads to a locally different imaginary temperature. This effect is an isotropic effect.

2. Photoelasticity which results from the stresses which remain after cooling. This effect is direction-dependent and is therefore an isotropic effect.

The compression as a result of the FEM analysis using the ABAQUS FEM program is represented in the figures.

There are two types of glass.

The first is described by a positive structural expansion coefficient $\alpha_{STR}$, in which the thermal expansion of the "liquid" glass is higher than the thermal expansion of the "solid" glass. In this case, the compression is arranged in the center of the hot spot. Outside the hot zone there are volumes with material which is less under stress or pressure. The compression results from the center toward the outer side in a dish-like arrangement. There are dishes with a high degree of compression and dishes with a small degree of compression toward the outside. The result is refractive index distributions as illustrated by way of example in FIG. 7 and represented successfully by the waveguides shown in FIGS. 1 and 2, which are illustrated as seen from the end side and show the intensity distribution which results during the conduction of light.

Glasses with a negative structural expansion coefficient have the opposite effect. The hot spot is placed under less pressure and outside the hot center there are dishes which are more strongly compressed or compacted.

Then, butterfly-like figures of pressurized glass, as illustrated by way of example in FIG. 8 and experimentally reproduced successfully by the anti-waveguide shown in FIG. 3, which is illustrated as seen from the end and shows the intensity distribution which results during the conduction of light, result outside the hot zone.

The inventors assume that plasma effects do not occur or do not have any significant influence at power densities of less than $10^{13}$ to $10^{14}$ watts per $cm^2$.

The standard wavelength of 800 nm is customarily used in fs experiments. Therefore, in the case of silicate glasses, the starting point is a multi-photon absorption process with at least four photons involved, leading to the formation of the waveguiding structures.

Since the process is a multi-photon process, the change in refractive index takes place only in the region of the focus, since with the lasers which are currently available the required photon density is generally only available here.

By suitable manipulation of the specimens, it is therefore possible to produce 3D structures with a diameter in the region of approximately 10 μm within the volume or bulk glass.

The introduction of the required energy into the glass and therefore the nature of the change in refractive index is set by a suitable selection of the writing parameters. In this context, it has proven particularly expedient for the wavelength of the ultrashort pulse to be set in the range of the multi-photon absorption of the glass. However, the utilization of direct resonances with ultrashort pulses can lead to excessive heating and therefore to cracks. Moreover, these resonances may then also take place outside the focus, which can cause the waveguides to become blurred.

This multi-photon absorption can be positively influenced by suitable doping, as described in more detail in the above-cited U.S. patent application Ser. No. 10/357,829 in the name of Schott Corporation, which is incorporated in its entirety by reference in the subject matter of the present application.

Furthermore, it has proven eminently suitable to set pulse durations which are as short as possible. Even when the fs laser ablation is compared with the ablation by laser in the ps range, it has been found that the structures formed using fs pulses are defined more homogeneously, more smoothly and more successfully by a multiple. Similar results can be observed when shorter fs pulses are used in the bulk.

Since more energy is transmitted into the glass per pulse, the structures can write with a lower total power overall, which is already of economic benefit to the user.

As has already been mentioned above, by suitable doping it is possible to set absorption bands in the glass which ensure an even better transmission of energy through resonant multi-photon absorption. By suitable setting of doping and writing parameters, it is therefore possible to achieve targeted changes in refractive index Δn of up to a few $10^{-2}$.

Furthermore, the shape of the structures produced can also be influenced by the doping. For a positive change in refractive index, reference is made to glasses 1 to 8 and glasses 9 and 10 comprising keatite or beta-quartz crystal or beta-quartz solid solution fractions in Table 1 below.

Furthermore, by radiating fs pulses into LAS glass which has already been ceramicized, it is possible to reverse the ceramicization step. It is thereby possible to produce positive or negative changes in the refractive index in the same glass depending on the preliminary treatment.

Certain LAS glasses can be converted into glass-ceramics with an ultra-low (zero) expansion by ceramicization before or after the microstructures have been produced, which is particularly advantageous for the production of, for example, demultiplexers/multiplexers or similar components. To carry out ceramicization steps of this nature, reference is made to extensive literature relating to the ceramicization of green glass.

Surprisingly, the inventors have for the first time discovered that with femtosecond lasers it has been possible to achieve positive changes in refractive index in multicomponent glasses, such as for example LAS glasses and glass-ceramics, in a similar way to those which have been achieved in fused silica glasses.

In other multicomponent glasses, it has hitherto only been possible to achieve refractive index profiles with a negative change in the refractive index.

Therefore, the invention for the first time makes it possible to achieve direct structuring using light which immediately leads to waveguiding structures in multicomponent glasses.

Moreover, the fs-written glasses according to the invention had a homogeneous, round structuring compared to fused silica glasses, which generally had a more dash-shaped form of the waveguides.

TABLE 1

Exemplary embodiments with results for Δn: "+" corresponds to a positive change in refractive index, "−" corresponds to a negative change in refractive index, "+/−" corresponds to a positive change in refractive index for green glass and a negative change in refractive index for ceramic, "?" corresponds to values which are still to be determined in more detail.

| | Examples | | | | | |
|---|---|---|---|---|---|---|
| | 1 % by weight | 2 % by weight | 3 % by weight | 4 % by weight | 5 % by weight | 6 % by weight |
| SiO$_2$ | 65.6 | 78.5 | 78.8 | 78.6 | 78.6 | 69.9 |
| Ag$_2$O | 0.2 | | | 0.2 | 0.2 | 0.1 |
| CeO$_2$ | 0.3 | 0.3 | | 0.1 | | 0.1 |
| Sb$_2$O$_3$ | 0.5 | 0.5 | 0.5 | 0.6 | 0.5 | 0.6 |
| B$_2$O$_3$ | 3.5 | 0.2 | 0.2 | 0.2 | 0.2 | 0.2 |
| Al$_2$O$_3$ | 12.7 | 4.2 | 4.3 | 4.2 | 4.2 | 3.5 |
| Li$_2$O | 9.3 | 9.6 | 9.6 | 9.5 | 9.6 | 4.8 |
| Na$_2$O | 1.8 | 1.7 | 1.7 | 1.7 | 1.7 | 18.2 |
| K$_2$O | 3.9 | 4.0 | 4.0 | 4.0 | 4.0 | |
| ZnO | 2.3 | 1.0 | 1.0 | 1.0 | 1.0 | 3.7 |
| P$_2$O$_5$ | | | | | | |
| CaO | | | | | | |
| BaO | | | | | | |
| As$_2$O$_3$ | | | | | | |
| TiO$_2$ | | | | | | |
| ZrO$_2$ | | | | | | |
| MgO | | | | | | |
| SnO | | | | | | 0.1 |
| Br | | | | | | 2.6 |
| F | | | | | | 3.0 |
| Delta n | (+) | | (+) | (+) | (+) | (+) |

| | Example | | | | | |
|---|---|---|---|---|---|---|
| | 7 % by weight | 8 % by weight | 9 % by weight | 10 % by weight | 11 % by weight | 12 % by weight |
| SiO$_2$ | 58.1 | 81.0 | 65.6 | 57.9 | 63.0 | 64.4 |
| Ag$_2$O | 0.2 | 0.1 | | | | |
| CeO$_2$ | 0.1 | 0.0 | | | | |
| Sb$_2$O$_3$ | | 0.4 | | 0.9 | 0.8 | 0.4 |
| B$_2$O$_3$ | | | | | | |
| Al$_2$O$_3$ | 22.8 | 3.9 | 21.4 | 25.4 | 12.5 | 14.9 |
| Li$_2$O | 3.5 | 9.2 | 3.6 | 3.7 | 6.2 | 6.2 |
| Na$_2$O | 1.0 | 0.8 | 0.2 | 0.8 | 9.0 | 9.7 |
| K$_2$O | | 3.8 | 0.6 | 0.3 | | |
| ZnO | 1.9 | 0.9 | 1.6 | 1.2 | 5.5 | 4.1 |
| P$_2$O$_5$ | 4.9 | | 7.2 | | | |
| CaO | 1.9 | | | | | |
| BaO | 2.6 | | | 2.3 | | |
| As$_2$O$_3$ | 0.5 | | 0.6 | | | |
| TiO$_2$ | | 0.1 | 2.3 | 2.4 | | |
| ZrO$_2$ | | | 1.8 | 1.6 | 3.0 | |
| MgO | | | 1.0 | 0.1 | | |
| SnO | | | | | | |
| Br | | | | | | |
| F | | | | | | |

TABLE 1-continued

Exemplary embodiments with results for Δn: "+" corresponds to a positive change in refractive index, "−" corresponds to a negative change in refractive index, "+/−" corresponds to a positive change in refractive index for green glass and a negative change in refractive index for ceramic, "?" corresponds to values which are still to be determined in more detail.

| Crystal phase | | | HQMK/ keatite | HQMK/ keatite | | |
|---|---|---|---|---|---|---|
| Delta n | (+) | $1.5 \times 10^{-3}$ | +/− | +/− | ? | ? |

UV Structuring

As well as with ultrashort pulses, it is also possible to produce changes in refractive index by radiating light of a certain wavelength into suitably doped glasses and thereby bringing about photooxidations, photoreductions, defect centers or similar reactions in the glass. In this case, light is preferably radiated into the range of absorption or two-photon absorption of the glass doped with suitable sensitive elements.

The redox reactions can in this case be produced directly by light, for example using the absorption centers $Eu^{2+}$, $CE^{3+}$ or by the use of suitable redox pairs, such as for example $Ce^{3+}/Ag^+$. The change in absorption or density produced by photoreactions then causes a corresponding change in the refractive index.

The Schott glass foturan can also be used for this purpose, but without Ce, instead with a silver reduction via other polyvalent ions, such as for example refining agents As, Sb or impurities (Fe, Cr, . . . ). Compared to exposure using UV lamps, lasers have higher intensities, so that special activators, such as Ce, can be present in lower concentrations or can be eliminated altogether.

The magnitude of the change in refractive index and the depth of the altered region can be controlled by suitably setting the beam intensity and the doping.

"True" 3D structuring, in which, as with the fs structuring, waveguides and similar structures can be produced in the glass, can be achieved by determining the threshold. The threshold is in this case exceeded either by beam bundling, for example by focusing, or by overlapping the foci of a plurality of beams.

In the case of the former method, it is advantageous in particular to make use of two-photon resonances, since in this case the glass is structured only in the center of the focus.

To provide sufficient photons for this process, in this case use is made of a ps laser. Two-photon absorption generally takes place via what is known as a virtual intermediate state.

Since there is only a relatively low probability of this "state" being occupied and a further photon must be available instantaneously, so as to ultimately bring about the transition into the real final state, a high energy density or photon density is required, and this is not normally present with cw lasers, even at high intensities. Therefore, a short-pulse laser is used for this type of structuring.

The use of a preferably localized real intermediate state for the TPA (two photon resonance) increases the transition probability. Moreover, the lifespan of this real state is longer, so that more time is available to achieve the desired final state by means of a further photon. In this case, therefore, it would be possible to dispense with the use of a short-pulse laser.

Furthermore, it is also possible for a wide range of refractive index profiles to be produced by homogenizing the beam intensity or performing other suitable adjustments to the intensity profile.

Crystallites and clusters, which can be used either for selective etching of the irradiated glass (e.g. lithium disilicate and lithium metasilicate) or for local coloring (e.g. Ag halide clusters), can be produced in the irradiated glass by suitable conditioning steps.

Preferred glasses for the UV structuring are given in Table 2.

The structures produced can be used both for micro-optical components and for photonic components and also for micromechanical components and for permanent, individual marking or labeling of the product.

Examples of applications for the optical components include waveguides, diffractive optical elements, gratings for sensors or for wavelength selection, waveguide lasers, etc. Micromechanical application fields would lie in the microfluidics sector (valves, connection stubs, nozzles, reaction chambers), and for electronic substrates. A further application lies in the field of optical data storage.

TABLE 2

Preferred exemplary embodiments for UV-structurable glass compositions (% by weight)

| Oxide | Example | | Preferred: | | Particularly preferred: | |
|---|---|---|---|---|---|---|
| | Min | Max | Min | Max | Min | Max |
| $SiO_2$ | 15 | 90 | 20 | 85 | 25 | 75 |
| $Al_2O_3$ | 1 | 35 | 5 | 35 | 3 | 27 |
| $Li_2O$ | 1 | 20 | 1 | 18 | 2 | 15 |
| $Na_2O$ | 0 | 20 | 0 | 20 | 0 | 18 |
| $K_2O$ | 0 | 20 | 0 | 15 | 0 | 10 |
| MgO | 0 | 20 | 0 | 15 | 0 | 10 |
| CaO | 0 | 20 | 0 | 15 | 0 | 10 |
| ZnO | 0 | 30 | 0 | 25 | 0 | 10 |
| SrO | 0 | 30 | 0 | 25 | 0 | 10 |
| BaO | 0 | 40 | 0 | 30 | 0 | 10 |
| PbO | 0 | 60 | 0 | 50 | 0 | 40 |
| $B_2O_3$ | 0 | 40 | 0 | 30 | 0 | 25 |
| $P_2O_5$ | 0 | 50 | 0 | 45 | 0 | 15 |
| $TiO_2$ | 0 | 45 | 0 | 30 | 0 | 10 |
| $Ta_2O_5$ | 0 | 45 | 0 | 30 | 0 | 10 |
| $ZrO_2$ | 0 | 55 | 0 | 40 | 0 | 10 |
| $La_2O_3$ | 0 | 55 | 0 | 40 | 0 | 10 |
| F | 0 | 8 | 0 | 6 | 0 | 5 |
| Cl | 0 | 15 | 0 | 10 | 0 | 8 |
| Br | 0 | 18 | 0 | 15 | 0 | 10 |
| I | 0 | 20 | 0 | 18 | 0 | 15 |
| Ag | 0 | 20 | 0 | 18 | 0 | 5 |
| CuO | 0 | 10 | 0 | 8 | 0 | 5 |
| Au | 0 | 10 | 0 | 8 | 0 | 5 |
| $As_2O_3$ | 0 | 8 | 0 | 5 | 0 | 4 |
| $Nb_2O_5$ | 0 | 10 | 0 | 8 | 0 | 5 |
| $Nd_2O_3$ | 0 | 10 | 0 | 8 | 0 | 5 |
| $Yb_2O_3$ | 0 | 10 | 0 | 8 | 0 | 5 |
| $Er_2O_3$ | 0 | 10 | 0 | 8 | 0 | 5 |
| $Eu_2O_3$ | 0 | 10 | 0 | 8 | 0 | 5 |
| $CeO_3$ | 0 | 10 | 0 | 8 | 0 | 5 |

The invention claimed is:

1. A photostructurable body comprising:
   glass, wherein the glass is a multicomponent glass having a positive change in refractive index Δn as a result of exposure to light, and wherein the glass is a lithium-aluminosilicate glass comprising less than 3.5% by weight of $B_2O_3$; and
   a waveguide structure directly written in said glass.

2. The photostructurable body as claimed in claim 1, wherein the glass comprises a composition from 15 to 90% by weight of $SiO_2$, from 1 to 35% by weight of $Al_2O_3$, and from 1 to 20% by weight of $Li_2O$.

3. The photostructurable body as claimed in claim 2, wherein the composition comprises from 20 to 85% by weight of $SiO_2$, from 5 to 35% by weight of $Al_2O_3$, from 1 to 18% by weight of $Li_2O$.

4. The photostructurable body as claimed in claim 2, wherein the composition comprises from 25 to 75% by weight of $SiO_2$, from 5 to 30% by weight of $Al_2O_3$, and from 2 to 15% by weight of $Li_2O$.

5. The photostructurable body as claimed in claim 1, wherein the glass comprises a sensitizer and/or activator selected from the group consisting of Ce ions, Er ions, Eu ions, and any combinations thereof.

6. The photostructurable body as claimed in claim 1, wherein the glass comprises a photosensitive element or a mixture of photosensitive elements selected from the group consisting of Cu, Ag, Au, $Ce^{3+}$, $Eu^{2+}$, polyvalent heavy metal and metal cations, and any combinations thereof.

7. The photostructurable body as claimed in claim 1, wherein the glass comprises a sensitizer and/or activator, and a photosensitive element.

8. The photostructurable body as claimed in claim 1, wherein the glass comprises halides selected from the group consisting of F, Br, Cl, I, and any combinations thereof.

9. The photostructurable body as claimed in claim 1, wherein the glass comprises Ag halide crystallites and/or clusters.

10. The photostructurable body as claimed in claim 1, wherein the glass comprises silver or gold clusters.

11. The photostructurable body as claimed in claim 1, wherein the glass comprises two-dimensional and/or three-dimensional structures, said two-dimensional and/or three-dimensional structures comprise fs irradiated crystallites.

12. The photostructurable body as claimed in claim 1, wherein the glass comprises a dopant that provides absorption centers for absorption of light.

13. A photostructure body, as claimed in claim 12, wherein the absorption centers for the absorption of light can be bleached out and can be used to influence the refractive index of the glass.

14. The photostructurable body as claimed in claim 13 wherein the absorption centers for the absorption of light effect a positive change in the refractive index under the action of light.

* * * * *